US009942359B2

(12) United States Patent
Broman et al.

(10) Patent No.: US 9,942,359 B2
(45) Date of Patent: Apr. 10, 2018

(54) METHOD AND SYSTEM FOR SYNCHRONIZING SOFTWARE MODULE HOSTS

(71) Applicant: YAHOO HOLDINGS, INC., Sunnyvale, CA (US)

(72) Inventors: Paul Broman, Marietta, GA (US); Stephen Owens, Marietta, GA (US); John Hazelwood, San Ramon, CA (US); Parag Jain, Sunnyvale, CA (US); Jayadev Chandrasekhar, Sunnyvale, CA (US); Steven Carlson, Pleasanton, CA (US); David Pham, San Jose, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 15/496,167

(22) Filed: Apr. 25, 2017

(65) Prior Publication Data

US 2017/0257462 A1 Sep. 7, 2017

Related U.S. Application Data

(63) Continuation of application No. 12/563,854, filed on Sep. 21, 2009, now Pat. No. 9,674,305.

(51) Int. Cl.
*H04L 29/08* (2006.01)
(52) U.S. Cl.
CPC .............. *H04L 67/34* (2013.01); *H04L 67/02* (2013.01)

(58) Field of Classification Search
CPC .. G06F 3/0481; G06F 17/30867; G06F 3/048; G06F 3/0484; G06F 3/0482; G06F 8/65; G06F 17/30651; G06F 17/30864; G06F 17/30554
See application file for complete search history.

(56) References Cited

U.S. PATENT DOCUMENTS

| 5,796,393 | A | 8/1998 | MacNaughton et al. |
| 5,878,219 | A | 3/1999 | Vance, Jr. et al. |
| 6,020,884 | A | 2/2000 | MacNaughton et al. |
| 6,976,075 | B2 | 12/2005 | Ma |
| 7,685,537 | B2 | 3/2010 | Hoyle |
| 7,793,227 | B2 * | 9/2010 | Wada ..................... G06F 3/0481 715/764 |
| 8,234,575 | B2 * | 7/2012 | Hartin ...................... G06F 8/65 715/744 |
| 2002/0035579 | A1 * | 3/2002 | Wang ............... G06F 17/30905 715/234 |

(Continued)

*Primary Examiner* — Abdullahi E Salad
(74) *Attorney, Agent, or Firm* — James J. DeCarlo; Greenberg Traurig, LLP

(57) ABSTRACT

Disclosed is a method and apparatus that receives, over a network from a computing device being used by a user, a request to configure a first software module host with respect to a software module, the first software module host associated with the user. The apparatus transmits over the network to the computing device instructions to configure, for display by the computing device, the first software module host in accordance with the request. The apparatus computer transmits over the network to the computing device instructions to apply the same configuration with respect to the software module to a second software module host, the second software module host also associated with the user.

20 Claims, 16 Drawing Sheets

(56) References Cited

U.S. PATENT DOCUMENTS

| | | | |
|---|---|---|---|
| 2005/0172262 A1* | 8/2005 | Lalwani | G06F 3/0481 |
| | | | 717/109 |
| 2007/0186177 A1 | 8/2007 | Both et al. | |
| 2007/0192725 A1 | 8/2007 | Chen et al. | |
| 2008/0184157 A1 | 7/2008 | Selig | |
| 2008/0275922 A1 | 11/2008 | Hertzfeld | |
| 2009/0106251 A1* | 4/2009 | Harris | G06F 17/30905 |
| 2009/0144723 A1* | 6/2009 | Hartin | G06F 8/65 |
| | | | 717/173 |
| 2010/0153884 A1 | 6/2010 | Chow et al. | |
| 2010/0199194 A1 | 8/2010 | Kumar et al. | |
| 2010/0228720 A1* | 9/2010 | Wormald | G06F 17/30905 |
| | | | 707/710 |

\* cited by examiner

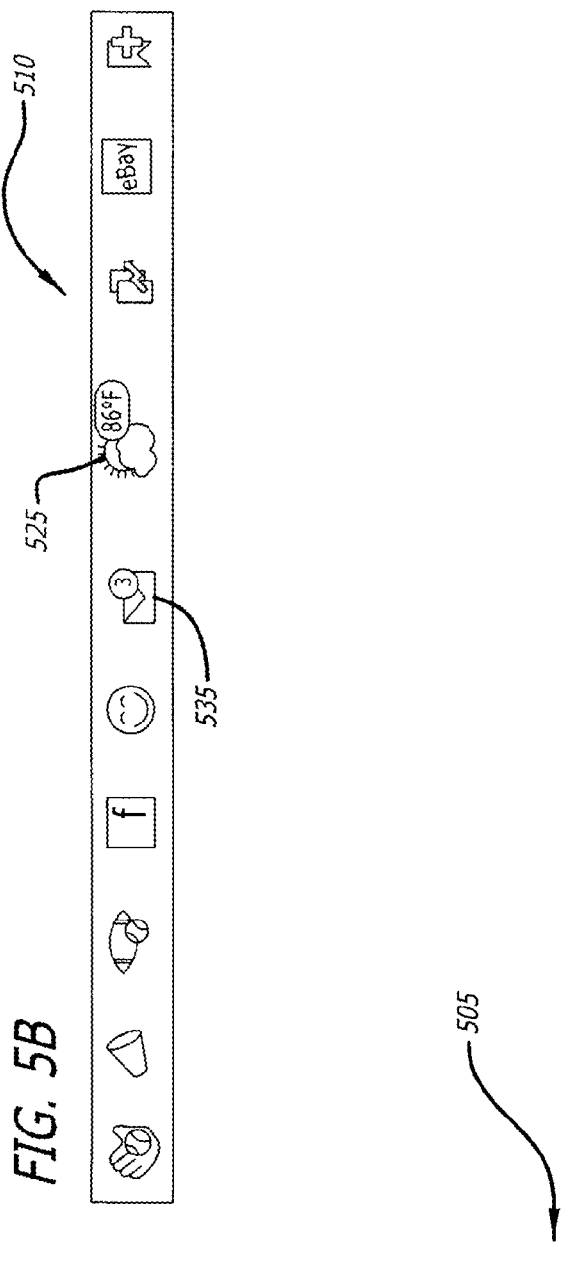

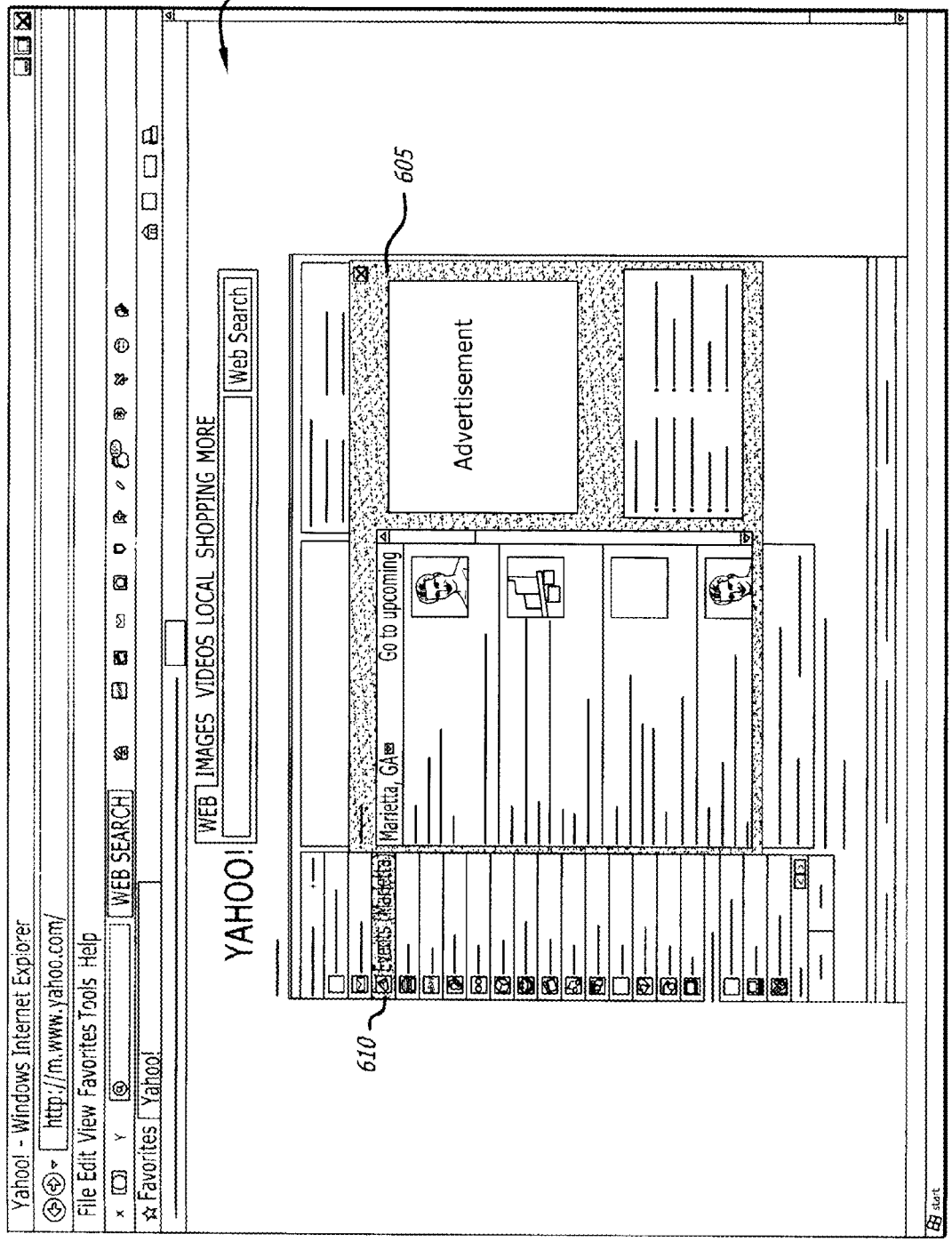

FIG. 6B

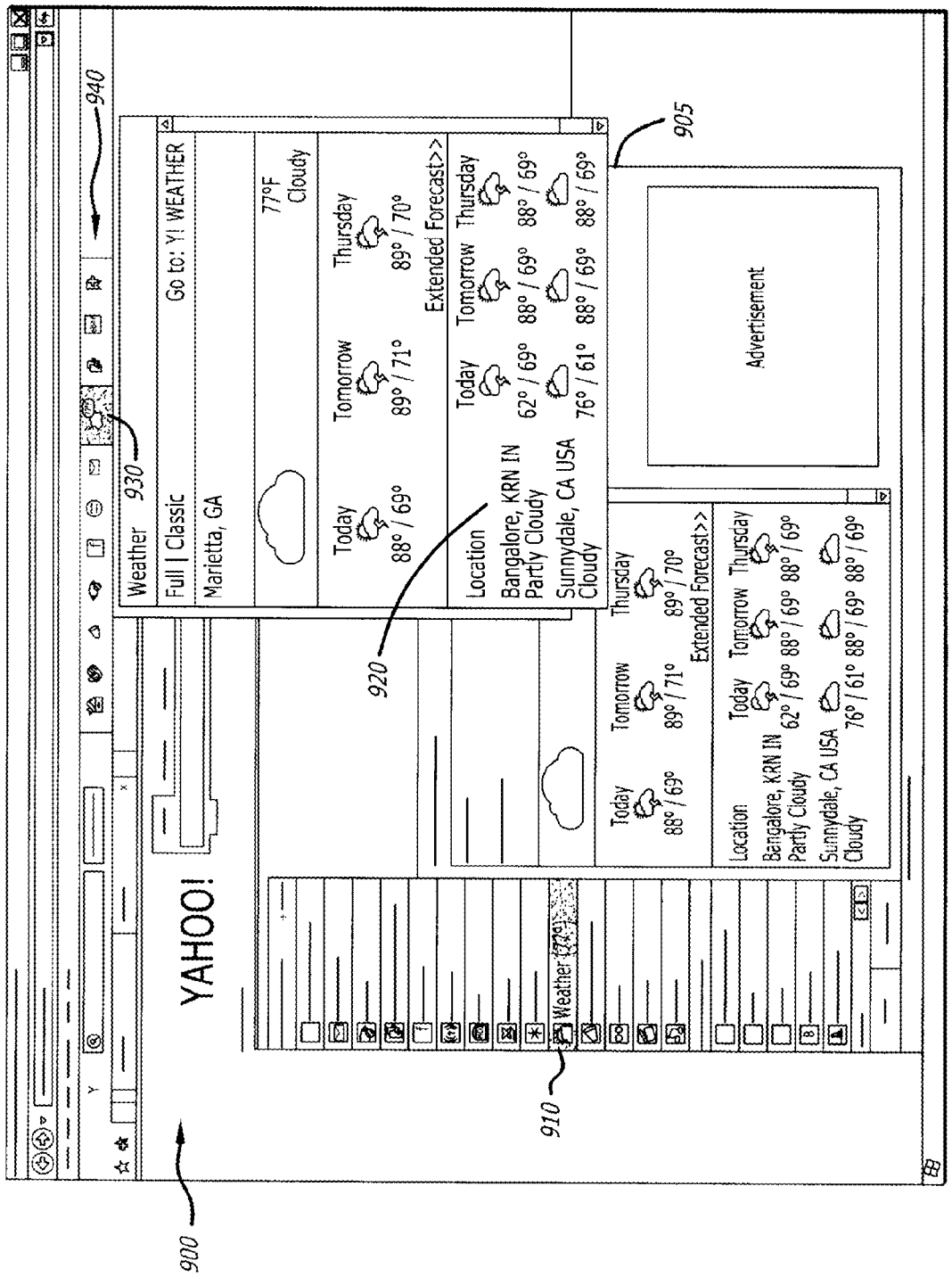

METHOD AND SYSTEM FOR SYNCHRONIZING SOFTWARE MODULE HOSTS

CROSS REFERENCE TO RELATED APPLICATION

This application is a continuation of, and claims priority from co-pending U.S. patent application Ser. No. 12/563,854, filed on Sep. 21, 2009, which is incorporated herein by reference in its entirety.

FIELD

The present disclosure relates to software module hosts, and more specifically to a method and system for synchronizing software module hosts.

BACKGROUND

Web pages often include a variety of features. For example, a web page may include a software toolbar containing one or more icons which, when selected, perform a particular function. The software toolbar is typically located on the top of the web page. Alternatively, after a user navigates to the particular web page, the user may select that the software toolbar be located within the browser user interface, sometimes referred to as the "chrome".

Web pages may also include other icons within its layout, such as icons positioned on one side of the web page. For example, a user may create an account with a web site. After the account has been created and the user logs into the web site, the web site (e.g., the front page of the web site) may provide the user with the ability to customize the web site. For example, after logging into the web site, the user may be able to customize the icons displayed in the front page. These icons may represent, for example, favorite web sites of the user or may provide particular information when hovered over or selected.

SUMMARY

In one aspect, a server computer receives, over a network from a computing device being used by a user, a request to configure a first software module host with respect to a software module, the first software module host associated with the user. The server computer transmits over the network to the computing device instructions to configure, for display by the computing device, the first software module host in accordance with the request. The server computer transmits over the network to the computing device instructions to apply the same configuration with respect to the software module to a second software module host, the second software module host also associated with the user.

In one embodiment, the server computer transmits over the network to the computing device instructions to convert the software module to a format associated with the second software module host. In one embodiment, the transmitting of instructions to configure the first software module host in accordance with the request further comprises transmitting instructions to add the software module to the first software module host. In another embodiment, the transmitting of instructions to apply the same configuration with respect to the software module to a second software module host further comprises transmitting instructions to add a corresponding software module to the second software module host. In one embodiment, the transmitting of instructions to configure the first software module host in accordance with the request further comprises transmitting instructions to remove the software module from the first software module host.

In one embodiment, the transmitting of instructions to apply the same configuration with respect to the software module to a second software module host further comprises transmitting instructions to remove a corresponding software module from the second software module host. In one embodiment, the transmitting of instructions to apply the same configuration with respect to the software module to a second software module host further comprises transmitting instructions to adjust text of a corresponding software module associated with the second software module host to match text of the software module associated with the first software module host.

In one embodiment, the transmitting of instructions to configure the first software module host in accordance with the request further comprises transmitting content for a badge associated with the software module. The transmitting of instructions to apply the same configuration with respect to the software module to a second software module host can further comprise transmitting content for a slideout of a corresponding software module, the content for the slideout being substantially similar to the content for the badge associated with the software module.

The first software module host can be a web page and the second software module host can be a software toolbar. In another embodiment, the first software module host is a software toolbar and the second software module host is a web page. In one embodiment, the first software module host is a web page and the second software module host is a mobile web page. In one embodiment, the first software module host is a mobile web page and the second software module host is a web page. In one embodiment, the first software module host is a software toolbar and the second software module host is a mobile web page. In one embodiment, the first software module host is a mobile web page and the second software module host is a software toolbar.

In another aspect, a method comprises displaying, by a computing device, a first software module host, receiving, by the computing device, a selection of a first software module associated with the first software module host, transmitting, by the computing device over a network to a server computer, a request for content associated with the selected first software module, receiving, by the computing device, content associated with the selected first software module, the received content being substantially similar to content associated with a second software module associated with a second software module host, and displaying, by the computing device, the received content for the first software module.

In one embodiment, the displaying the received content further comprises converting the received content to a format appropriate for the first software module host. The receiving of content associated with the selected first software module further comprises receiving content associated with a slideout of an icon in a software toolbar. In one embodiment, the received content is substantially similar to content associated with a second software module associated with a second software module host further comprises the received content being substantially similar to content of a badge of an icon in a web page.

In another aspect, a system comprises a server computer configured to receive over a network from a computing device being used by a user a request to configure a first software module host with respect to a software module, the first software module host associated with the user, the server computer further configured to transmit over the network to the computing device instructions to configure, for display by the computing device, the first software module host in accordance with the request, and the server computer further configured to transmit instructions to apply the same configuration with respect to the software module to a second software module host, the second software module host also associated with the user. In one embodiment, the system includes a database in communication with the server computer, the database configured to store the layout of the first software module host associated with the user. In one embodiment, the database is further configured to store the layout of the second software module host associated with the user.

In one aspect, a method includes displaying, by a computing device used by a user, a first software module host and a second software module host, receiving, by the computing device, a request to configure a first software module host with respect to a software module, the first software module host associated with the user, displaying, by the computing device, the first software module host in accordance with the request, receiving, over a network from a server computer, information associated with a second software module host, the information corresponding to the configuration of the software module with respect to the first software module host, the second software module host associated with the user, and displaying, by the computing device, the second software module host.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 5B shows a screen shot of the software toolbar (e.g., second software module host) from FIG. 5A in accordance with an embodiment of the present disclosure;

FIG. 5C shows a screen shot of one embodiment of the designated area of software modules disclosed in FIG. 5A;

FIG. 6A is a screen shot of a web page (e.g., first software module host) illustrating a badge or slideout of an Events software module of the web page in accordance with an embodiment of the present disclosure;

FIG. 6B shows an expanded screen shot of the badge or slideout of the Events software module depicted in FIG. 6A;

FIG. 9A shows a screen shot of a web page (e.g., first software module host) illustrating a badge associated with a weather icon on the web page and a software toolbar slideout associated with a corresponding weather icon of a software toolbar (e.g., second software module host) in accordance with an embodiment of the present disclosure;

DESCRIPTION OF EMBODIMENTS

Figure 1:
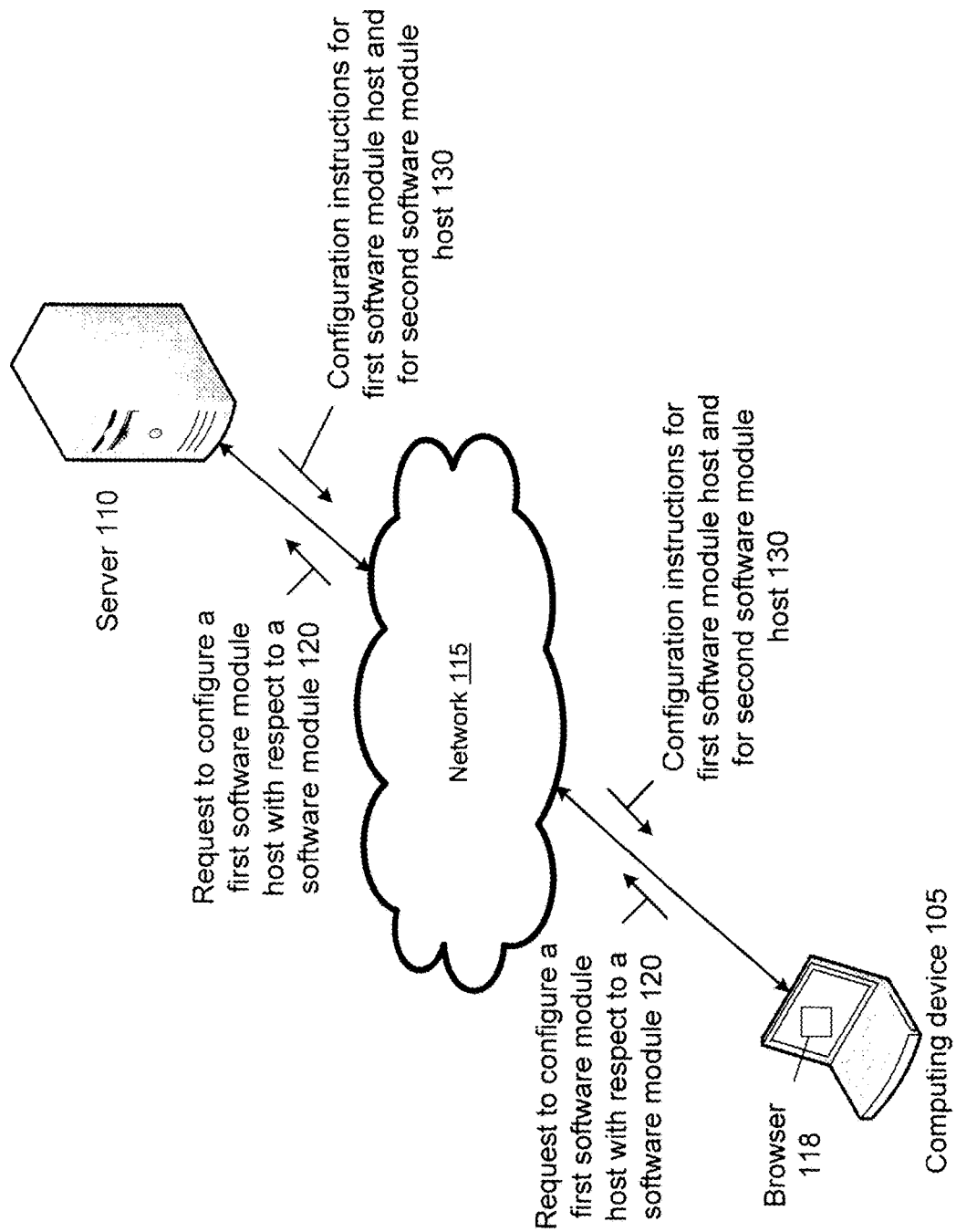
FIG. 1 is a block diagram of a computing device communicating with a server over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Figure 2:
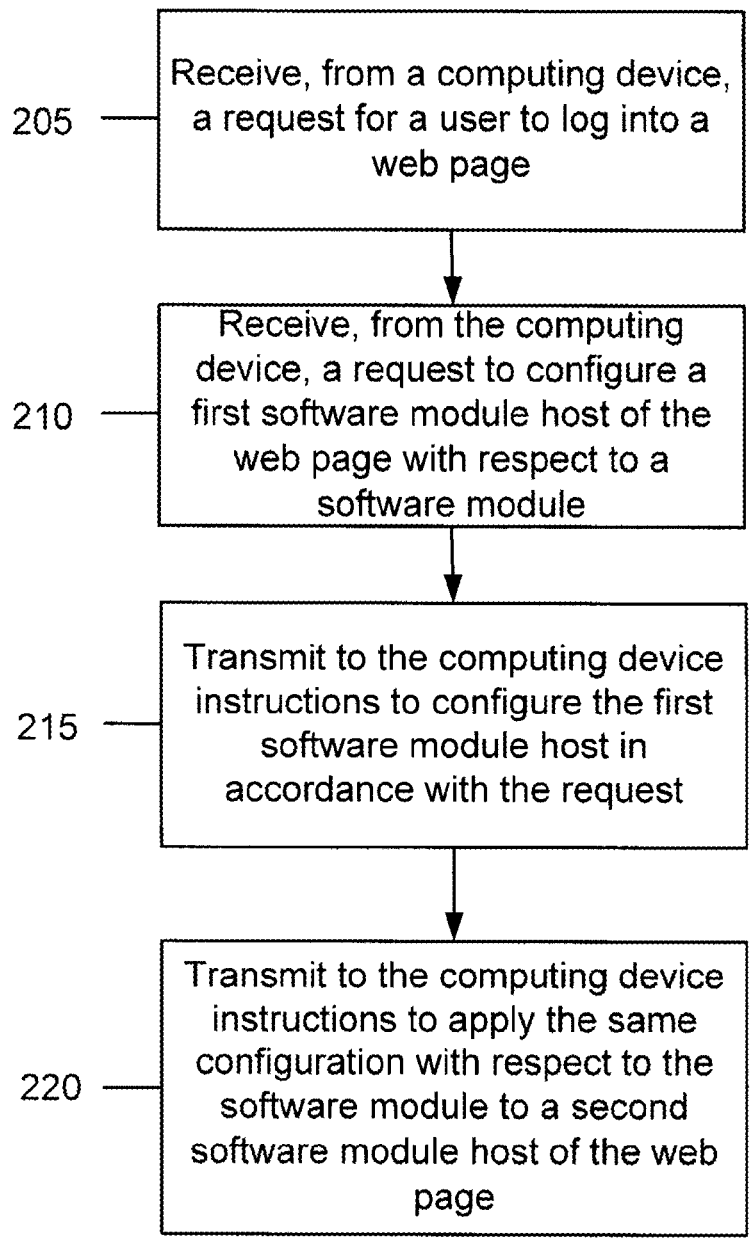
FIG. 2 is a flowchart illustrating the steps performed by the server of FIG. 1 to synchronize two software module hosts in accordance with an embodiment of the present disclosure.

FIG. 1 is a block diagram of an embodiment of a computing device 105 communicating with a server 110 over a network 115. FIG. 2 is a flowchart showing an embodiment of steps performed by the server 110. A user of the computing device 105 uses a web browser 118 executing on the computing device 105 to, for example, navigate to a web page (e.g., Yahoo!'s front page—www.yahoo.com). Web pages such as Yahoo!'s front page (www.yahoo.com) often contain many different features and functions, such as different areas hosting one or more software modules (e.g., software applications). In one embodiment, the software modules are represented by icons. These areas hosting one or more software modules may be at the top of the web page, on one side of the web page, at the bottom of the web page, etc. These different areas are referred to as software module hosts. As used herein, a software module host is a software entity that can host one or more software modules. Examples of a software module host include a software toolbar, a web page (e.g., www.yahoo.com), a mobile web page, etc. In one embodiment, the software module hosts can be associated with and customized by a user.

For purposes of this disclosure (and as described in more detail below with respect to FIG. 11), a computer or computing device such as the computing device 105 and/or server 110 includes a processor and memory for storing and executing program code, data and software which may also be tangibly stored or read from any type or variety of well known computer readable storage media such as magnetic or optical discs, by way of non-limiting example. Computers can be provided with operating systems that allow the execution of software applications in order to manipulate data. Personal computers, personal digital assistants (PDAs), wireless devices, cellular telephones, internet appliances, media players, home theater systems, servers, and media centers are several non-limiting examples of computing devices. The computing device 105 and the server 110 can, in one embodiment, also include a display, such as a screen or monitor.

In one embodiment, the user of the computing device 105 uses the browser 118 to navigate to a web page, such as Yahoo!'s front page www.yahoo.com. In one embodiment, the user then enters (e.g., types in) his or her login information into the web page. The server 110 receives a request for the user to log into the web page (step 205) and, if the login information is correct, logs the user into the web page. In one embodiment, the configuration of the web page changes once the user logs into the web page (e.g., new icons are displayed). In another embodiment, the configuration of the web page for the user using the computing device 105 is stored locally on the computing device 105 itself.

In one embodiment, the user then requests to configure a first software module host on the web page with respect to a software module. For example, the user can decide to add or remove an icon from a software toolbar associated with the web page. The computing device 105 transmits the request 120 to the server 110 and the server 110 receives the request (step 210). The server 110 then transmits instructions 130 to configure the first software module host in accordance with the request (step 215). For example, the server 110 transmits instructions 130 to add or remove the requested icon to or from the toolbar of the web page. In another embodiment and as further described below, the instructions relate to a portion of or all of text, image or other visual and/or content aspects of an icon.

In one embodiment, the server 110 then transmits to the computing device 105 configuration instructions 130 to apply the same configuration with respect to the software module to a second software module host of the web page (step 220). For example, the server 110 can transmit instructions to the computing device 105 to add (or remove) the same icon to an area on the side of the webpage itself that was added to the software toolbar. In one embodiment, the instructions to configure the second software module host (e.g., the side of the web page) are a separate communication than the instructions to configure the first software module host (e.g., the toolbar). Alternatively, the two instructions are transmitted as one transmission to the computing device 105.

In another embodiment, the second software module host is a software module host that is not associated with the web page (e.g., Yahoo!'s front page) that contains or is the first software module host but is instead related to another web page associated with the user. For example, the server 110 can configure a mobile web page (a second software module host) for display on a mobile computing device in the same manner as the first software module host. Thus, in one embodiment the user can add an icon to his or her toolbar displayed on a web page (e.g., Yahoo!'s front page) (or even the user's browser chrome) and this same icon can automatically be added to another web page associated with the user (e.g., Yahoo!'s mobile web page) or a toolbar in this other web page (e.g., a toolbar displayed by the Yahoo! mobile web page). In one embodiment, this synchronization of two (or more) software module hosts with respect to a particular software module occurs after the user selects a particular preference (e.g., on the web page, on a toolbar, etc.) for this synchronization to occur. Further, in one embodiment the user can also specify other synchronization details, such as which software module hosts are synchronized, when the synchronization occurs, etc. Alternatively, the synchronization occurs automatically unless the user selects otherwise. In one embodiment, the software module order or layout is synchronized between two or more software module hosts.

Figure 3:
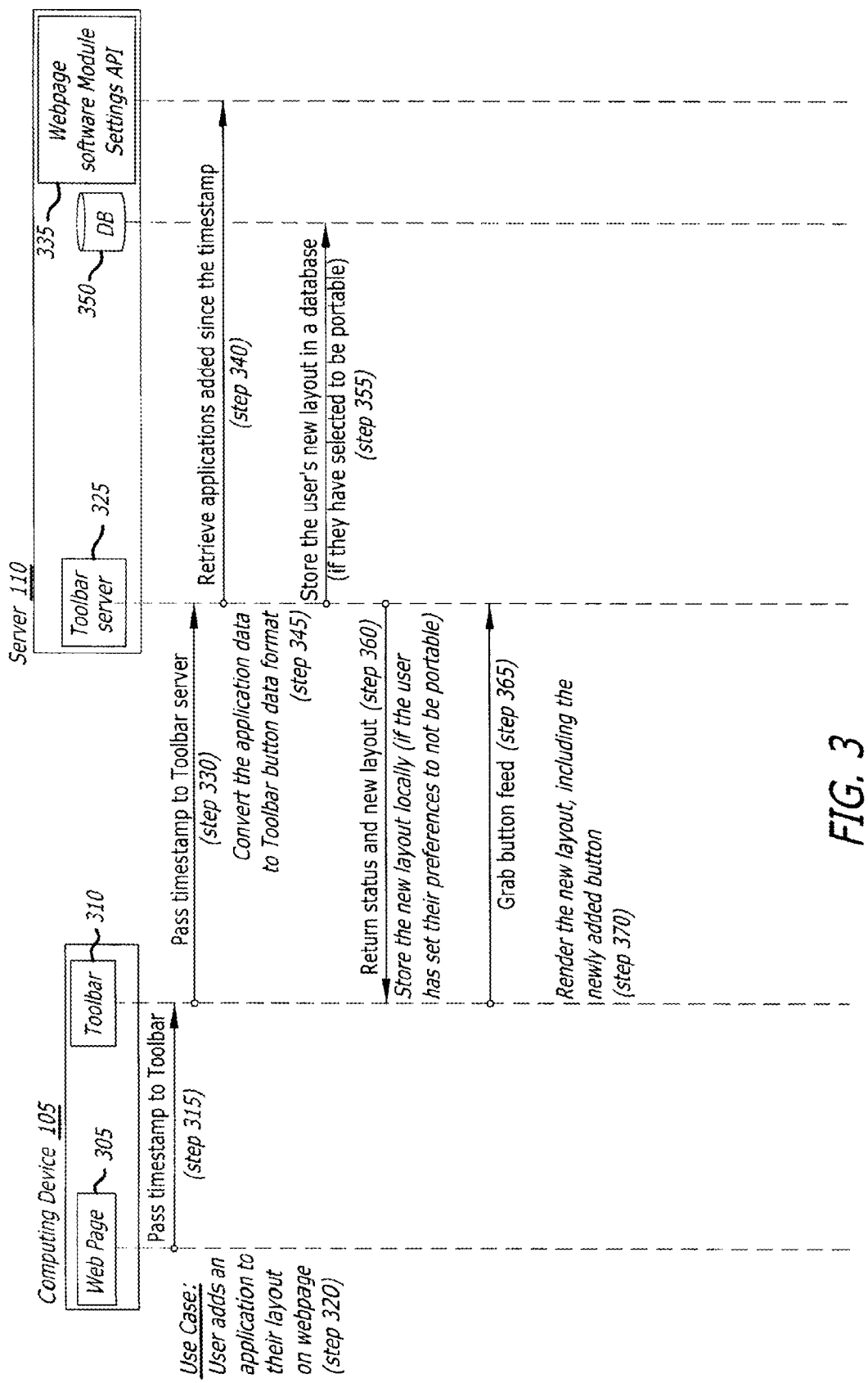
FIG. 3 illustrates a flow diagram of steps that occur to synchronize the configuration of a web page (e.g., first software module host) with a software toolbar (e.g., second software module host) in accordance with an embodiment of the present disclosure.

FIG. 3 illustrates a flow diagram of an embodiment of steps that occur to synchronize the configuration of a web page (first software module host) with a software toolbar (second software module host). In one embodiment, a user views a web page 305 which has a software toolbar 310 on the computing device 105. In one embodiment, the web page 305 transmits (e.g., at a predetermined time, periodically, occasionally, etc.) a timestamp to the toolbar 310 (step 315). In one embodiment, after the timestamp has been transmitted to the toolbar 310, the user adds a software application to their layout on the web page 305 (step 320). In one embodiment, the computing device 105 (toolbar 310) transmits the timestamp to the server 110 (e.g., a toolbar server 325) (step 330). The toolbar server 325 retrieves, from a web page software module settings Application Program Interface (API) 335, software applications that have been added to the web page 305 since the transmitted timestamp (step 340). In one embodiment, the web page software module settings API 335 is located on and accessible from an independent server. In one embodiment, the toolbar server 325 then converts the software application data received from the API 335 into a toolbar button data format (step 345). In one embodiment, the toolbar server 325 stores the user's new layout in a database 350 (step 355).

In one embodiment, the toolbar server 325 then transmits the new layout (and, in one embodiment, status information) to the toolbar 310 being displayed by the computing device 105 (step 360). In one embodiment, the computing device 105 stores the new layout locally (e.g., in a memory). In one embodiment, the toolbar 310 obtains a button feed for the new layout from the toolbar server 325 (step 365). The toolbar 310 then renders the new layout, including the newly added button (step 370).

Figure 4A:
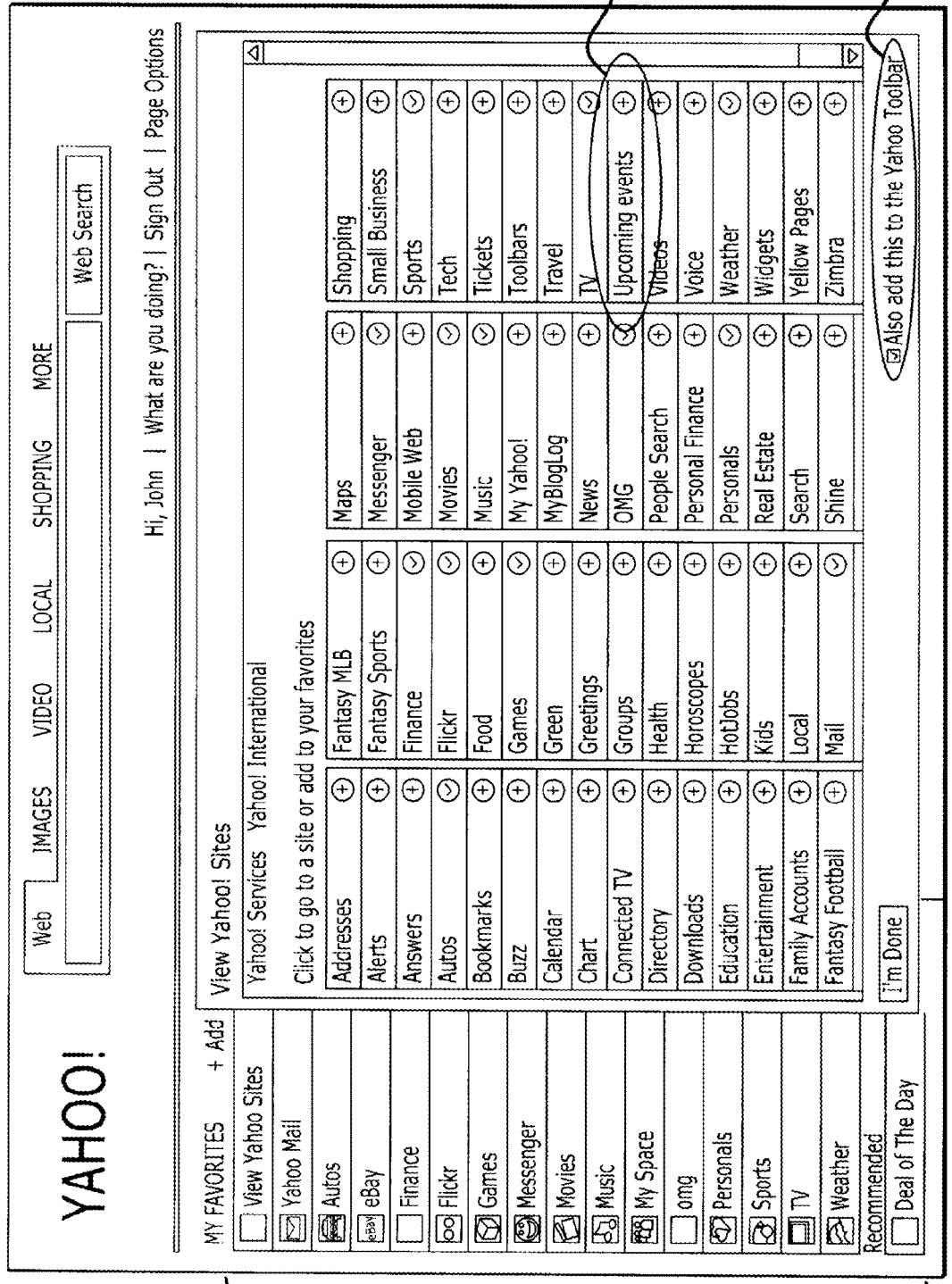
FIGS. 4A and 4B are screen shots of the synchronization process of a web page (e.g., first software module host) and a software toolbar (e.g., second software module host) in accordance with an embodiment of the present disclosure.
Figure 4B:
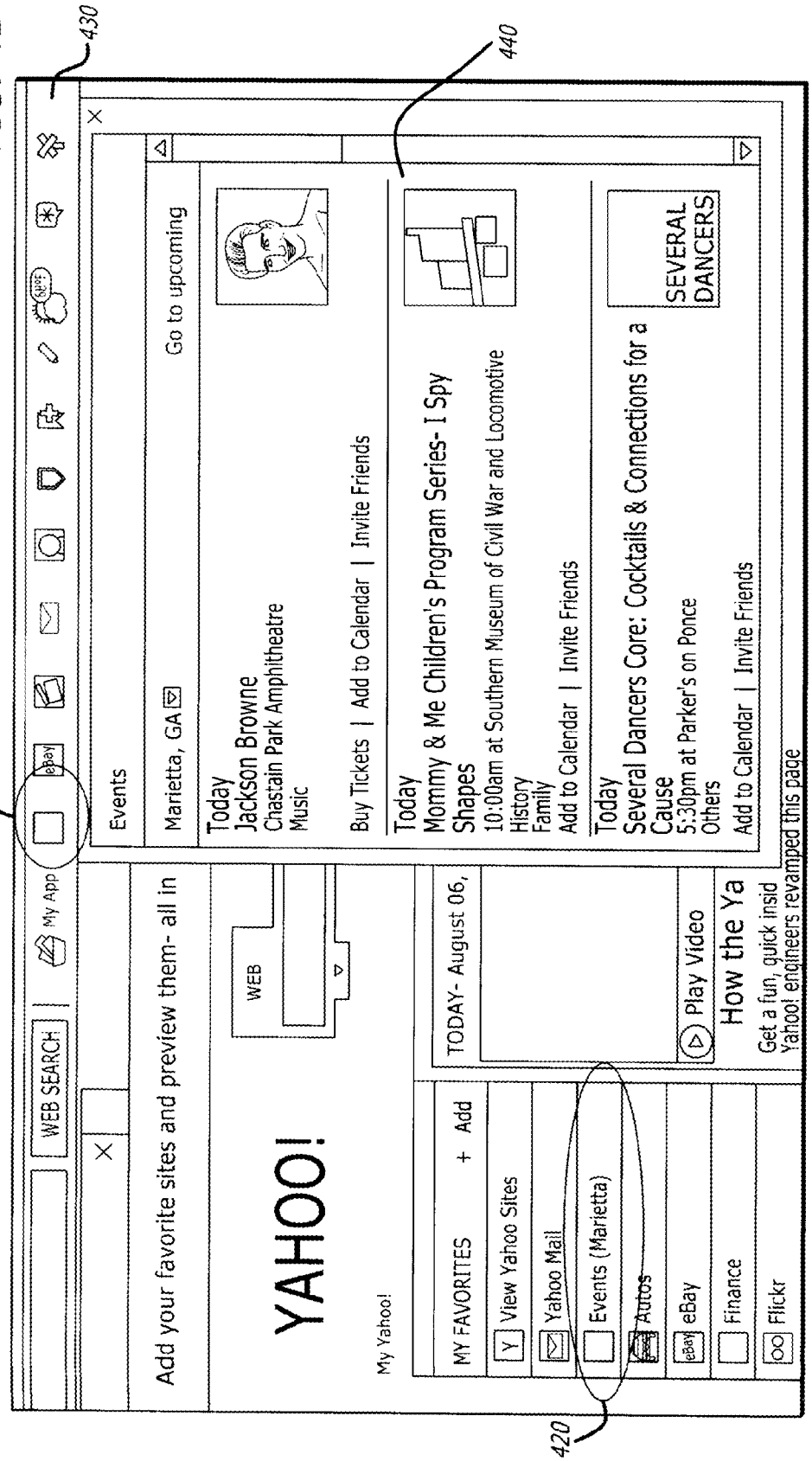

FIGS. 4A and 4B show an embodiment of screen shots of the synchronization process. With respect to FIG. 4A, a user has navigated to and logged into Yahoo!'s front page. The user has selected a checkbox 405 to indicate that the user wants to synchronize their Yahoo! web page with their Yahoo! toolbar. Although shown as a checkbox 405 at the bottom of the Yahoo! front page, the ability for a user to indicate that the user wants to synchronize their Yahoo! web page with their Yahoo! toolbar can be implemented in any fashion, such as via a slideout of a toolbar icon, a toolbar icon, a checkbox (in any location), etc.

The user wants to add another software module to the area of software modules 410 accessible on the left side of the Yahoo! front page. The user selects to add a software module 415 associated with "Upcoming Events". After the user has selected to add this software module 415 to the first software module host (the Yahoo! web page—in particular, the area of software modules 410), the Events module 420 is added to the web page. A corresponding Events module 425 is then added to software toolbar 430. In one embodiment, the Events module icon 425 (e.g., icon graphic and/or text font) is substantially similar to the Events module icon 420 (e.g., icon graphic and/or text font). Alternatively, the icon 425 (e.g., icon graphic(s) and/or text font) is different than the icon 420 (e.g., icon graphic(s) and/or text font). The content associated with the Events module 425 (shown in content window 440) is substantially similar to the content associated with the Events module 420 (not shown in FIG. 4B, but described in another example below).

Figure 5A:
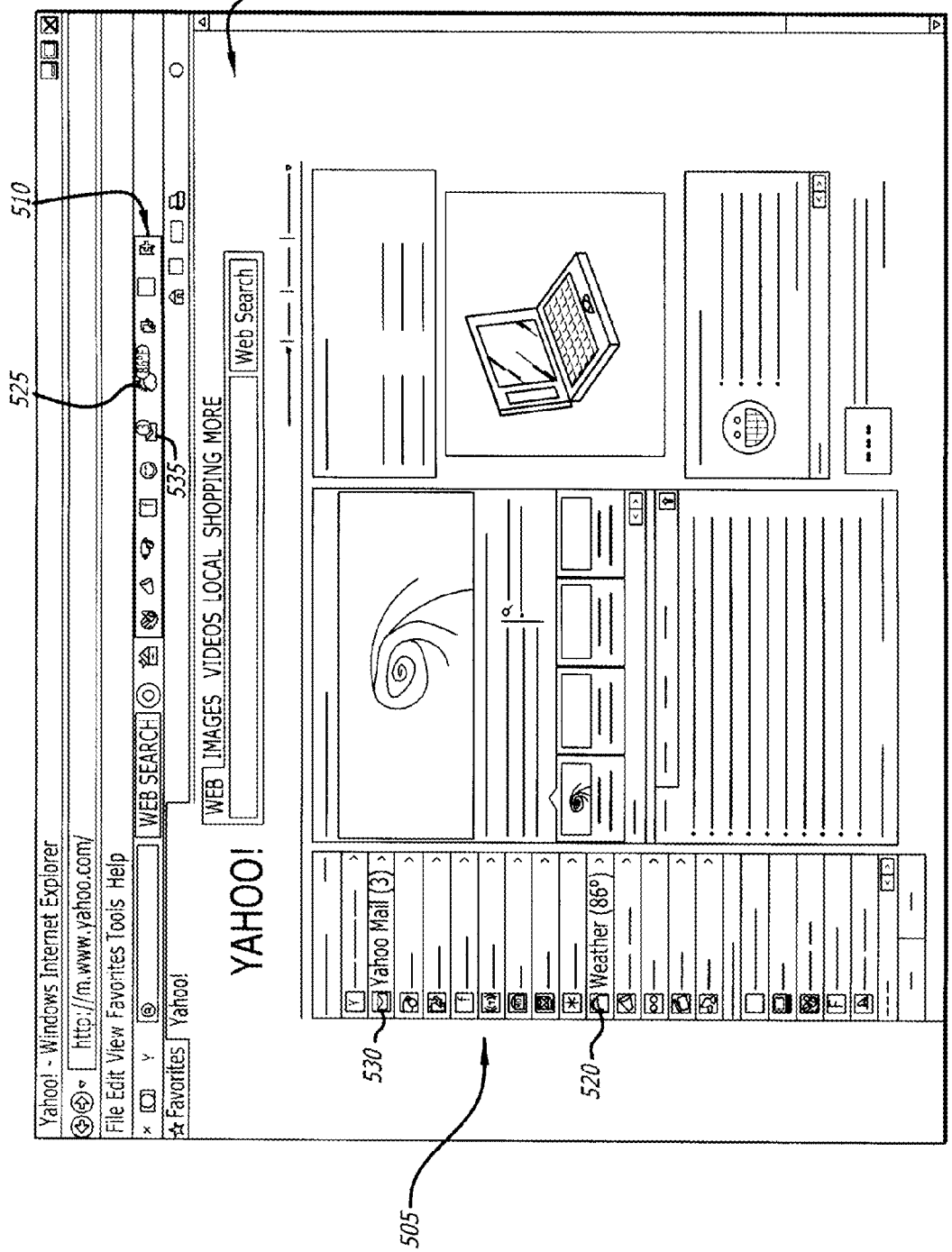
FIG. 5A shows a screen shot of a web page (e.g., first software module host) with a designated area of software modules and a software toolbar (e.g., second software module host) in accordance with an embodiment of the present disclosure.

FIG. 5A shows an embodiment of a screen shot of a web page 500 (e.g., first software module host) with a designated area 505 of software modules and a software toolbar 510 (e.g., second software module host). In one embodiment, the icons that have been added to the toolbar 510 in response to the user adding corresponding icons to the designated area 505 are in different orders. Alternatively, the icons added to the toolbar 510 are in the same order as the icons added to the area 505. In one embodiment, the user can specify the order of the icons in the area 505 and/or the toolbar 510. Further, as described above, an icon in the toolbar 510 may have similar characteristics (e.g., the same or similar icon graphic(s) and/or text font) or different characteristics (e.g., different icon graphic(s) and/or text font) as a corresponding icon in area 505 of the web page 500.

FIGS. 5B and 5C show embodiments of screen shots of the designated area 505 and the software toolbar 510. According to some embodiments and as briefly stated above, some or all text of corresponding software modules (e.g., icons) can be synchronized. In one embodiment, the text (e.g., temperature readings or email count) displayed next to or as an overlay of corresponding icons (e.g., weather icons 520, 525 or email icons 530, 535 as shown in FIGS. 5A and 5B) are synchronized (e.g., periodically, at set times, etc.) after the corresponding icons have been added to the area 505 and the toolbar 510, as shown in FIGS. 5A and 5B. As illustrated in FIG. 5B, the corresponding weather icon 525 of the toolbar 510 includes overlay text of a temperature reading (also shown in FIG. 5A as 86° F.). FIG. 5B depicts the corresponding email icon 535 of the toolbar 510 including overlay text of the email count (3 emails as shown in FIG. 5A).

As shown in FIG. 5C, a weather icon 520 of the area 505 includes a temperature reading (also shown in FIG. 5A as 86° F.). FIG. 5C depicts an email icon 530 of the area 505 including a number indicating how many emails (3 emails) in the user's inbox that have not yet been read (also shown in FIG. 5A as 3 emails).

In another embodiment, the appearance of an element of corresponding software modules are synchronized. For example, the graphic of an icon of a toolbar (e.g., toolbar 510) can be synchronized to match the graphic of a corresponding icon of a designated area of a web page (e.g., area 505). As a specific example, if a weather icon 520 shows a sun (sunny weather), the weather icon 525 can be synchronized to show a sun (sunny weather). Similarly, if the weather icon 520 shows rain, the weather icon 525 can be synchronized to show rain. In one embodiment, condition code can be transmitted from the server 110 to the computing device 105 to synchronize the two software modules (e.g., the two icons 520, 525).

Figure 6B:
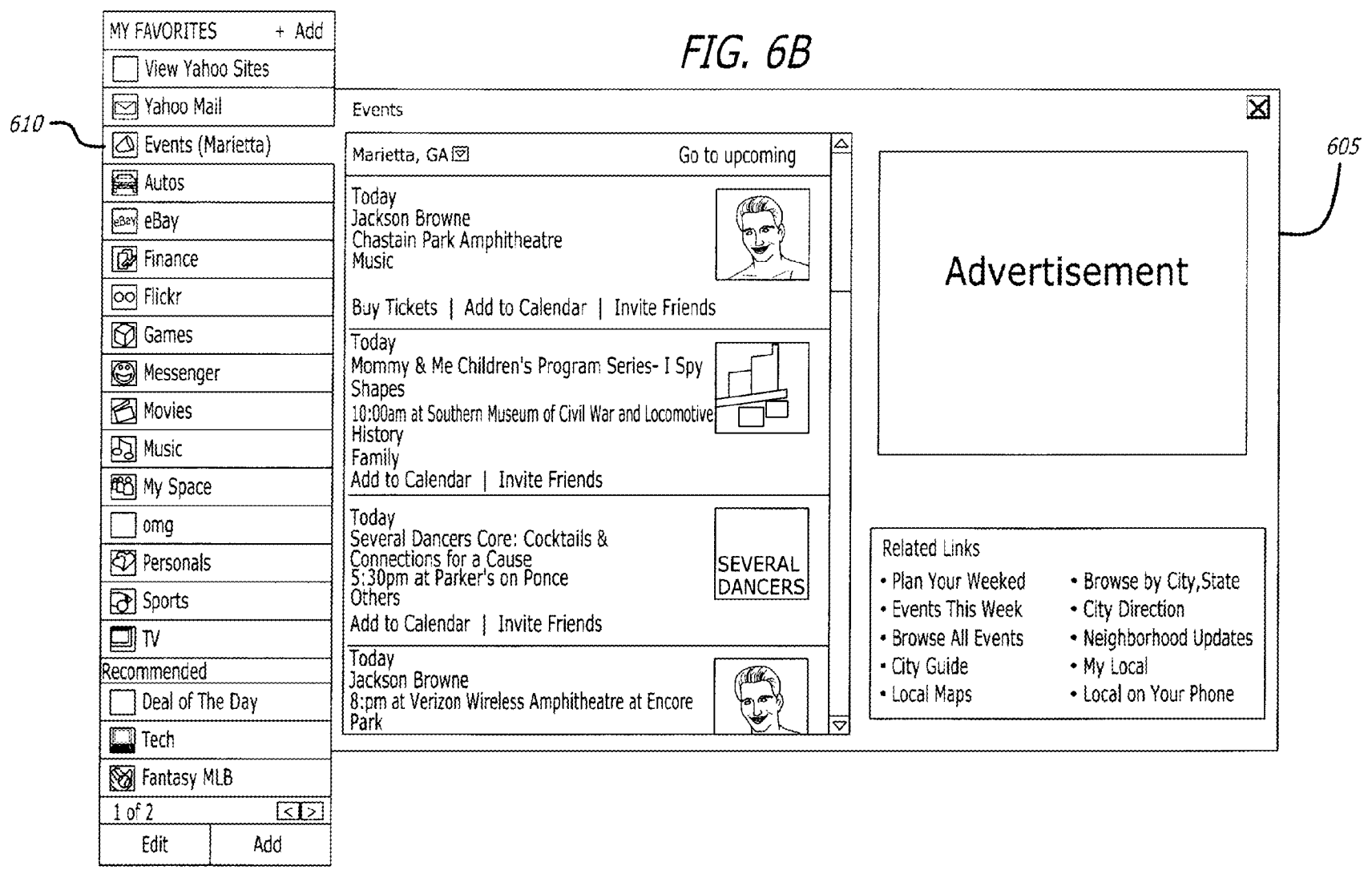

FIG. 6A is a screen shot of a web page 600 illustrating an embodiment of a "badge" or slideout 605 of a software module, an Events module 610 of the web page 600 (e.g., first software module host). As illustrated in FIG. 6B, which shows an expanded screen shot of the content depicted in FIG. 6A, the badge 605 can include, for example, content associated with the software module 610, advertisements, related links, and any other items associated with the software module 610.

Figure 7A:
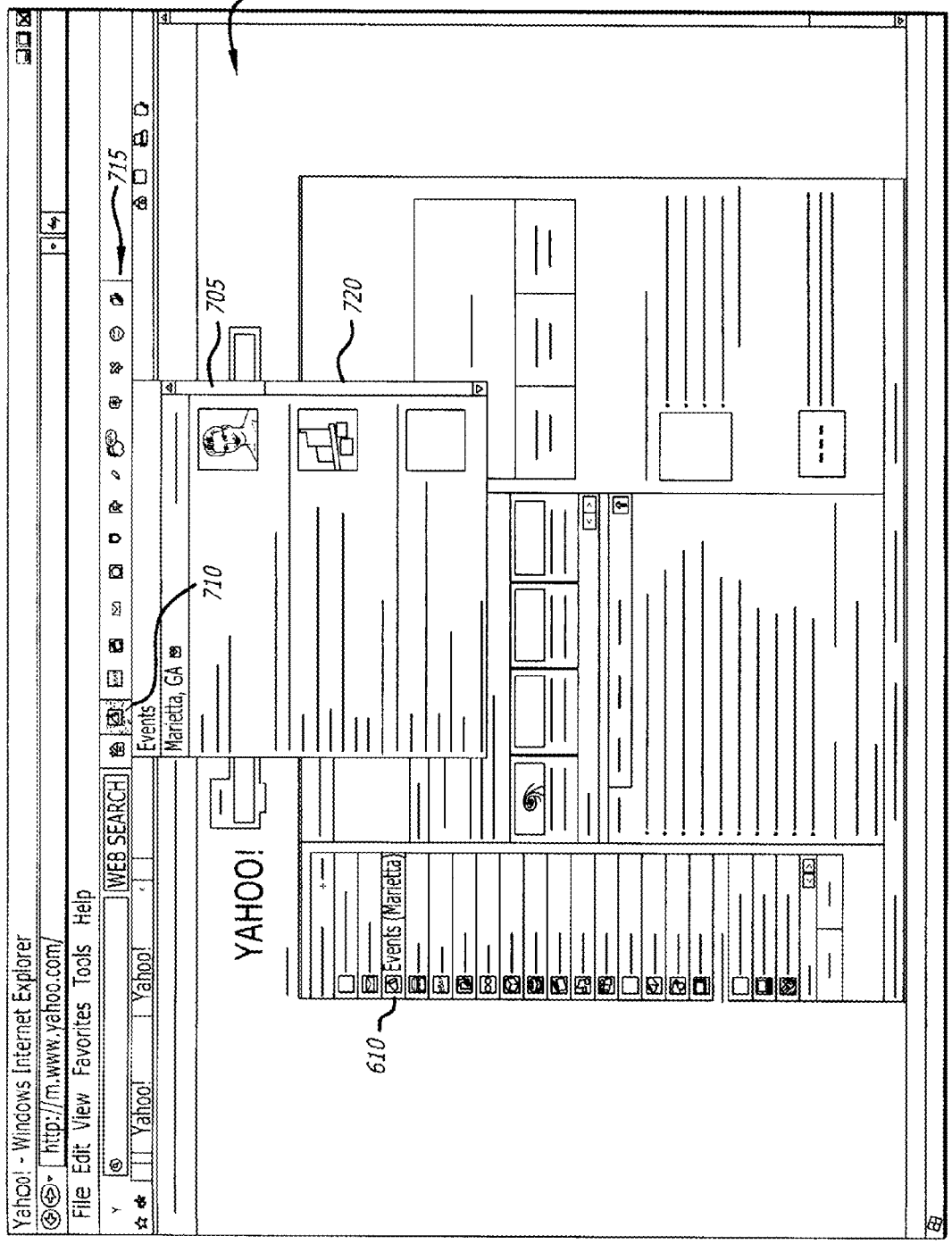
FIG. 7A is a screen shot of the web page of FIG. 6 illustrating a slideout of a corresponding Events software module of the software toolbar (e.g., second software module host) in accordance with an embodiment of the present disclosure.
Figure 7B:
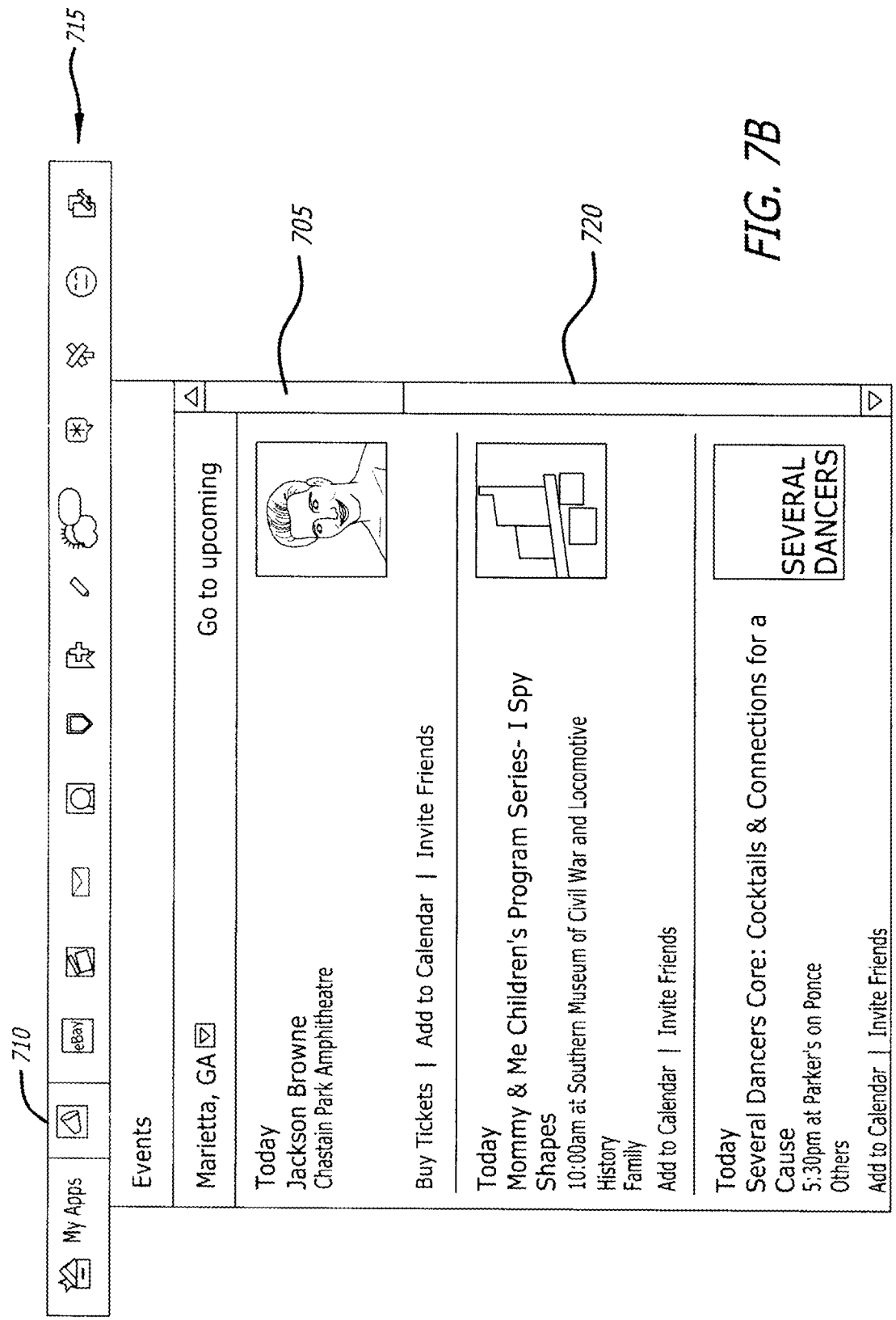
FIG. 7B is an expanded screen shot of the slideout of the Events software module of the software toolbar as depicted in FIG. 7A.
Figure 8:
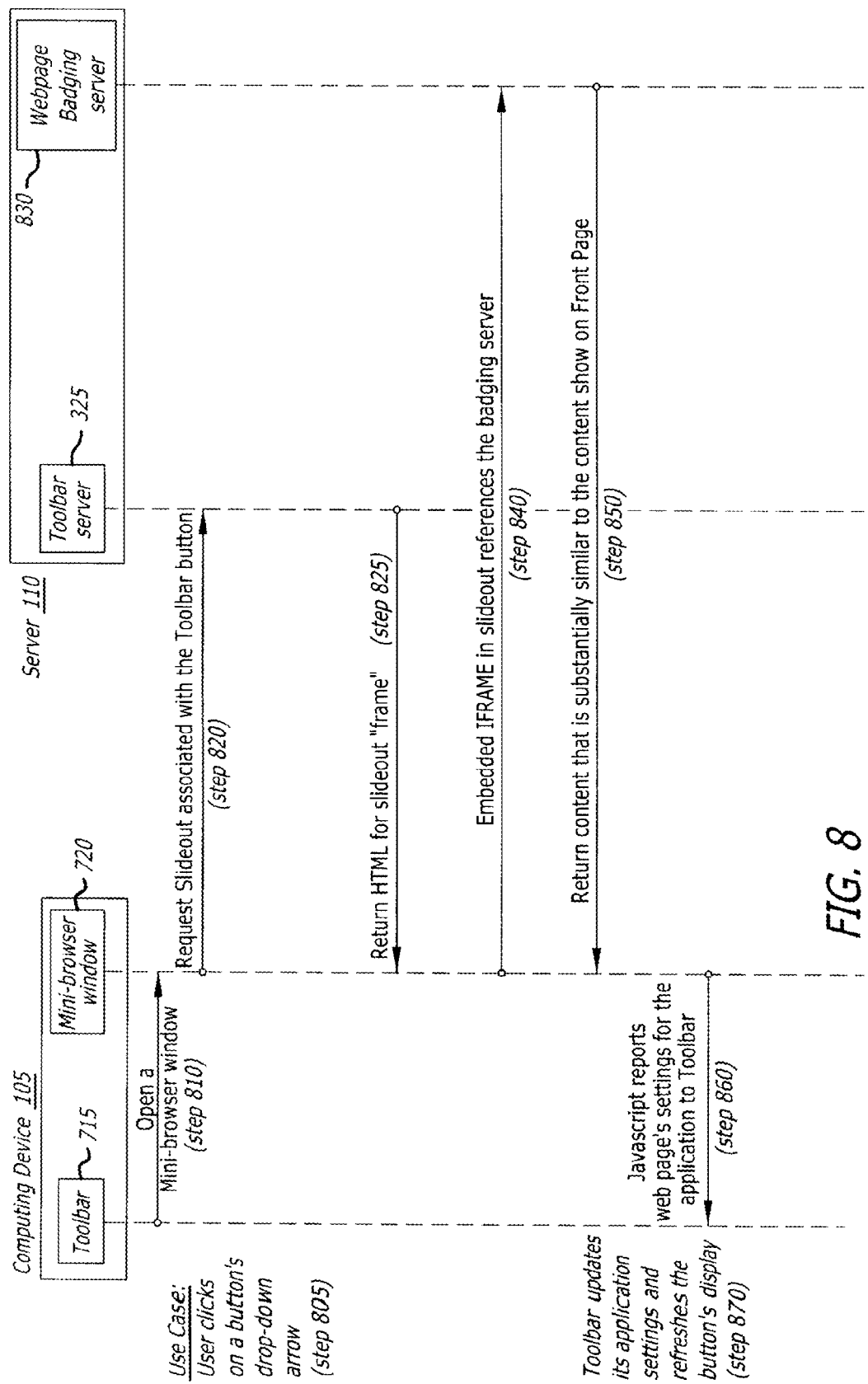
FIG. 8 shows a flow diagram of steps that occur to display substantially similar content for the slideout of the Events software module of the software toolbar of FIG. 7 as the badge of the Events software module of the web page of FIG. 6 in accordance with an embodiment of the present disclosure.

FIG. 7A is a screen shot of the web page 600 illustrating an embodiment of a slideout 705 of the corresponding software module, the Events module 710 of toolbar 715 (e.g., second software module host). FIG. 7B is an expanded screen shot of the slideout 705 of the Events module 710 of the toolbar 715 as depicted in FIG. 7A. FIG. 8 shows a flow diagram of an embodiment of steps that occur to display substantially similar content for the slideout 705 of the Events module 710 of the toolbar 715 (of FIGS. 7A and 7B) as the badge 605 of the Events module 610 of the web page 600 (of FIG. 6). In one embodiment, the user of the web page 600 clicks on the Events module's 710 drop-down arrow (step 805). The toolbar 715 opens a mini-browser window (step 810) (e.g., window 720 of slideout 705 shown in FIGS. 7A and 7B). The mini-browser window 720 requests slideout content associated with the button 710 from the server 110 (e.g., toolbar server 325) (step 820). In one embodiment, the server 110 (e.g., toolbar server 325) transmits instructions (e.g., HTML) for the slideout frame (step 825). In one embodiment, the instructions for the slideout frame (transmitted in step 825) references content from the server 110 (e.g., a web page badging server 830). The mini-browser window 720 transmits a request for the content to the web page badging server 830 (step 840), and the server 830 returns content that is substantially similar to (e.g., visually identical to) the content shown in the badge 605 of the corresponding Events module 610 of the web page 600 (step 850). In one embodiment, the mini-browser window 720 receives the content transmitted in step 850 and reports (e.g., via Javascript) the web page's settings for this software module to the toolbar 715 (step 860). In one embodiment, the toolbar 715 then updates its software module settings and refreshes the toolbar button's display (step 870).

Figure 9B:
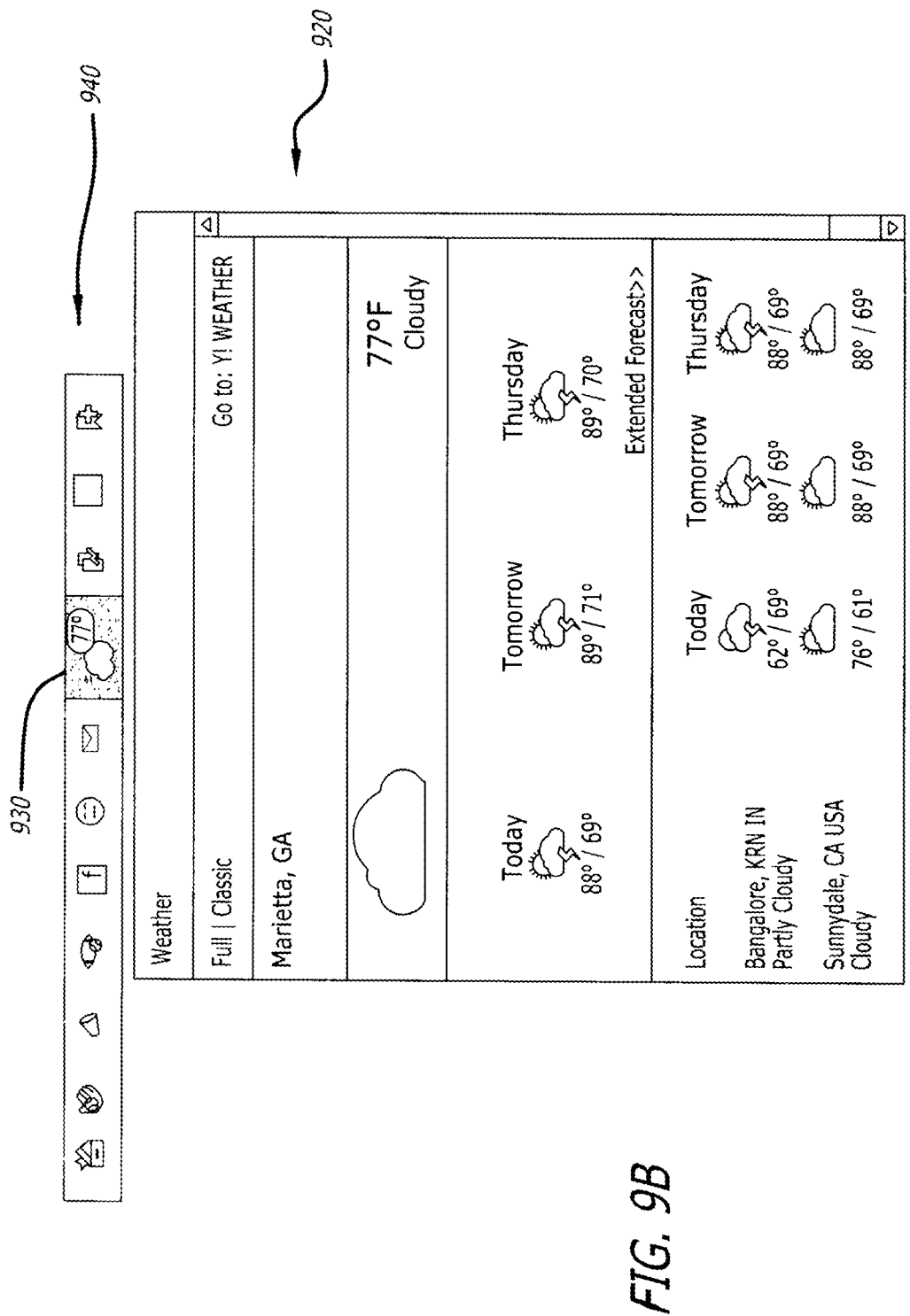
FIG. 9B shows a screen shot of the software slideout associated with the weather icon of the software toolbar as depicted in FIG. 9A.

FIG. 9A shows a screen shot of an embodiment of a web page 900 illustrating a badge 905 associated with a weather icon 910 on the web page 900 (e.g., first software module host) and a toolbar slideout 920 associated with a corresponding weather icon 930 of toolbar 940 (e.g., second software module host). FIG. 9B shows a screen shot of toolbar slideout 920 associated with the weather icon 930 of the toolbar 940 as depicted in FIG. 9A. As shown in FIGS. 9A and 9B, in this embodiment the content of the badge 905 and the slideout 920 are substantially similar (e.g., both show the same weather for the same locations), but the badge 905 and the slideout 920 have different frames surrounding the content and different links.

Figure 10:
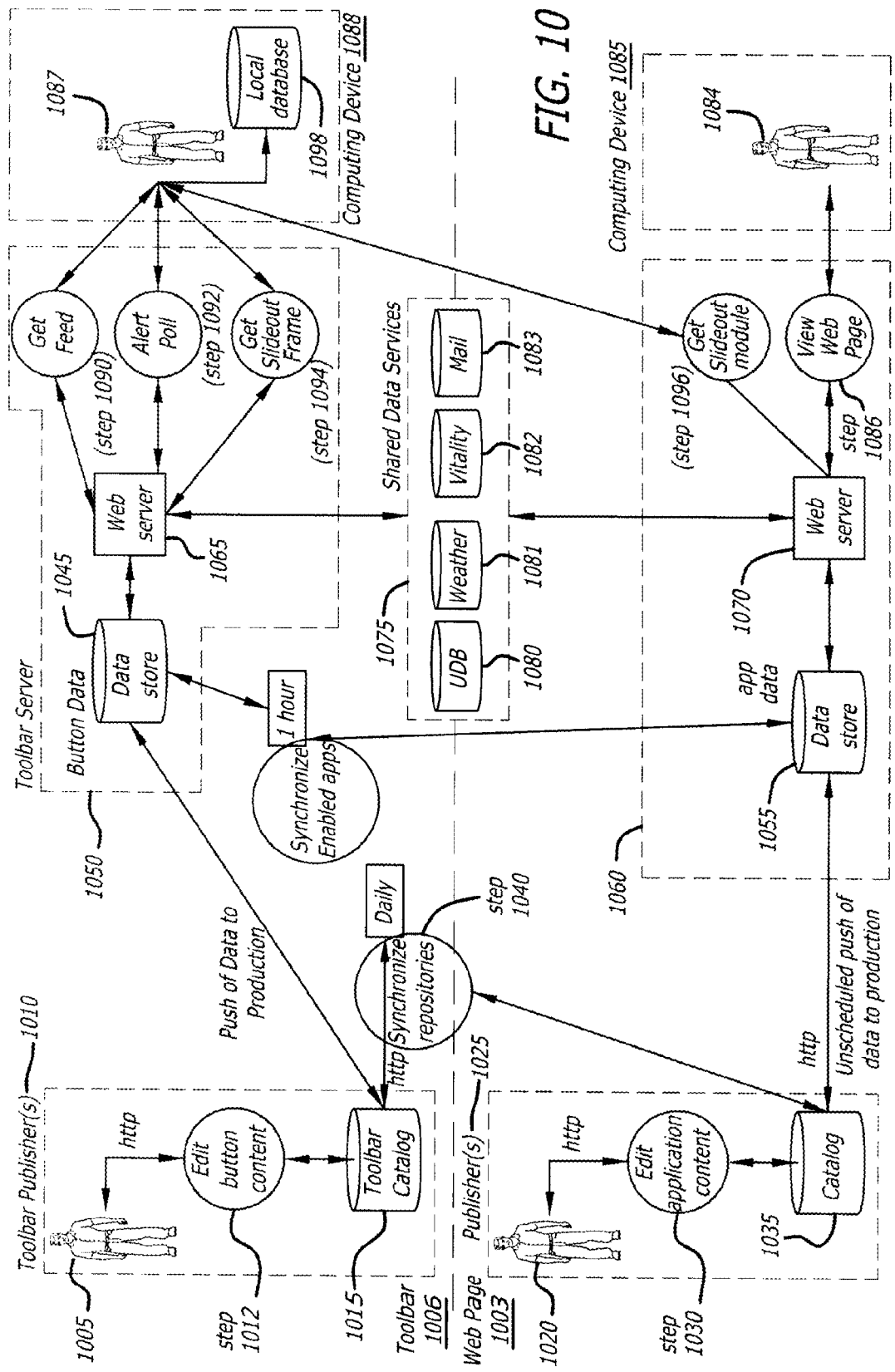
FIG. 10 is a block diagram of a computer architecture enabling the synchronization of two software module hosts, a web page and a software toolbar, in accordance with an embodiment of the present disclosure.

FIG. 10 is a block diagram of an embodiment of the computer architecture enabling the synchronization of two software module hosts—a web page 1003 and a toolbar 1006. In one embodiment, an editor 1005 of a toolbar publisher 1010 edits button content (step 1012) of a toolbar and stores the content in a toolbar catalog (e.g., a database) 1015. In one embodiment, an editor 1020 of a web page publisher 1025 edits software application content (step 1030) of a web page and stores the content in a catalog (e.g., database) 1035. In one embodiment, the catalogs 1015, 1035 are synchronized (step 1040). Further, in one embodiment, content from the toolbar catalog 1015 can be transmitted (e.g., periodically, at a set time, etc.) to a data store 1045 of a toolbar server 1050. Similarly, the content from the web page publisher catalog 1035 can be transmitted (e.g., periodically, at a set time, etc.) to a data store 1055 of a server 1060.

In one embodiment, each server 1050, 1060 includes a respective web server 1065, 1070. In one embodiment, each web server 1050, 1060 is in communication with its respective data store 1045, 1055 and shared data services 1075. The shared data services 1075 can include one or more databases. For example, the shared data services 1075 can include one or more user databases (UDB), such as UDB 1080 storing information associated with a particular user (e.g., the user's login information, web page layout information, toolbar configuration, etc.). The shared data services 1075 can also include one or more other databases, such as a database for weather information 1081, a database for vitality information 1082, and/or a database for mail 1083.

A user 1084 of a computing device 1085 (e.g., computing device 105) can view the web page (step 1086). A user 1087 of a computing device 1088 (e.g., which may also be computing device 105 or computing device 1085) can view the toolbar. As shown, when the user 1087 views (or interacts with) the toolbar 1006, the computing device 1088 can obtain a button feed from the web server 1065 (step 1090), an alert feed (step 1092), and a slideout frame (step 1094) for a button when the user 1087 selects the button.

As described above and in one embodiment, after the slideout frame for the toolbar is transmitted from the web server 1065, a slideout module is obtained from the web server 1070 (step 1096). In one embodiment and as described above, this occurs so that the content of the slideout of a toolbar button is substantially similar to the content of a badge of a corresponding software module of the web page 1003. In one embodiment, toolbar settings for the user 1087 are stored in a local database 1098 of the computing device 1088. It should be noted that the hardware components shown and described herein can be distinct components or can be incorporated into one or more devices.

Figure 11:
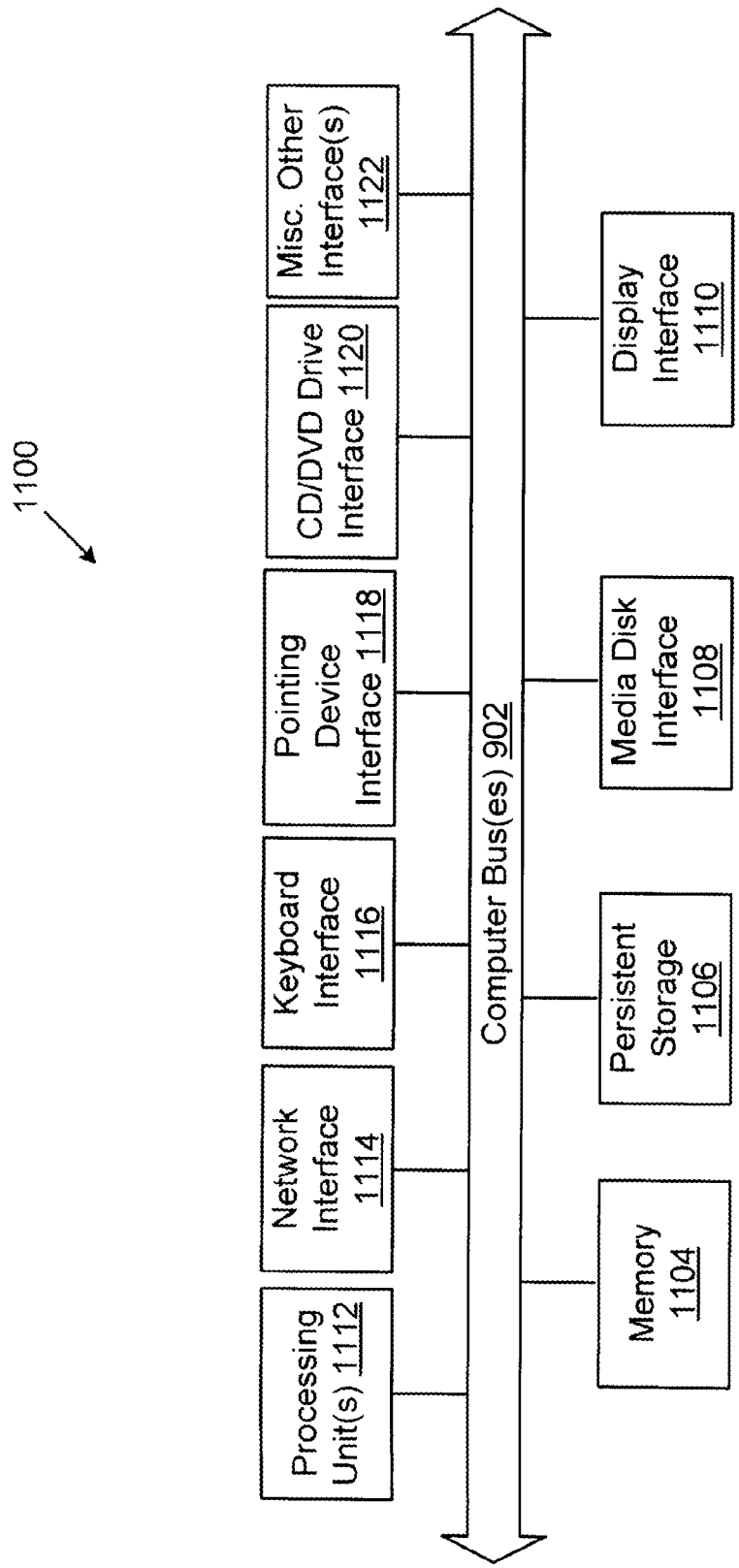
FIG. 11 is a block diagram illustrating an internal architecture of a computing device in accordance with an embodiment of the present disclosure.

FIG. 11 is a block diagram illustrating an internal architecture of an example of a computing device, such as server 110 and/or computing device 105, in accordance with one or more embodiments of the present disclosure. As shown in FIG. 11, internal architecture 1100 includes one or more processing units (also referred to herein as CPUs) 1112, which interface with at least one computer bus 1102. Also interfacing with computer bus 1102 are fixed disk 1106, network interface 1114, memory 1104, e.g., random access memory (RAM), run-time transient memory, read only memory (ROM), etc., media disk drive interface 1108 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, storage 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage 1106 is a computer readable storage medium that can be used to store software and data, e.g., an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure.

For the purposes of this disclosure a computer readable storage medium stores computer data, which data can include computer program code executable by a computer, in machine readable form. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, via a computing device, a request associated with a first software module host associated with a web page, said request comprising a first request to customize the first software module host, and a second request to synchronize the first software module host with a second software module host associated with a toolbar application, said first request comprising information identifying a software module not presently associated with said web page;
   identifying, via the computing device in response to receiving said request, the first software module host on a network;
   adding, via the computing device, said software module to a listing of software modules associated with said first software module host, said addition of said software module host providing the web page associated with the first software module host with additional functionality not present prior to said addition;
   identifying, via the computing device in response to said request and said addition, the second software module host; and
   synchronizing, via the computing device, the first software module host and the second software module host, said synchronization comprising adding said software module to a listing of software modules associated with said second software module host, said addition of said software module host providing the toolbar associated with the second software module host with additional functionality not present prior to said synchronization.

2. The method of claim 1, wherein said information identifying the software module further comprises information associated with an existing software module within said listing of said first software module host, said information associated with functionally not presently associated with said existing software module.

3. The method of claim 2, further comprising:
   adding said information to said existing software module associated with the first software module host.

4. The method of claim 2, further comprising:
   determining whether said existing software module is in said listing of the second software module host.

5. The method of claim 4, further comprising:
   adding said existing software module to said second software module host listing of modules when said determination reveals said existing software module was not in said listing of the second software module host, said added existing software module comprising said information.

6. The method of claim 4, further comprising:
   adding said information to said existing software module when said determination reveals said existing software module was in said listing of the second software module host.

7. The method of claim 1, wherein said adding and synchronization occurring in response to said request causes the webpage and the toolbar to modify how they respectively display content.

8. The method of claim 1, further comprising:
   converting said software module into a format of said first software module host, wherein said adding occurs upon the completion of said conversion; and
   storing, in a database on the network, a layout of said webpage based on said addition.

9. The method of claim 1, further comprising:
   converting said software module into a format of said second software module host, wherein said synchronization occurs upon the completion of said conversion; and
   storing, in a database on the network, a layout of said toolbar based on said synchronization.

10. A non-transitory computer-readable storage medium tangibly encoded with computer-executable instructions, that when executed by a computing device, perform a method comprising:
    receiving, via the computing device, a request associated with a first software module host associated with a web page, said request comprising a first request to customize the first software module host, and a second request to synchronize the first software module host with a second software module host associated with a toolbar application, said first request comprising information identifying a software module not presently associated with said web page;
    identifying, via the computing device in response to receiving said request, the first software module host on a network;
    adding, via the computing device, said software module to a listing of software modules associated with said first software module host, said addition of said software module host providing the web page associated with the first software module host with additional functionality not present prior to said addition;
    identifying, via the computing device in response to said request and said addition, the second software module host; and
    synchronizing, via the computing device, the first software module host and the second software module host, said synchronization comprising adding said software module to a listing of software modules associated with said second software module host, said addition of said software module host providing the toolbar associated with the second software module host with additional functionality not present prior to said synchronization.

11. The non-transitory computer-readable storage medium of claim 10, wherein said information identifying the software module further comprises information associated with an existing software module within said listing of said first software module host, said information associated with functionally not presently associated with said existing software module.

12. The non-transitory computer-readable storage medium of claim 11, further comprising:
    adding said information to said existing software module associated with the first software module host.

13. The non-transitory computer-readable storage medium of claim 11, further comprising:

determining whether said existing software module is in said listing of the second software module host, wherein said addition synchronization further comprises:

adding said existing software module to said second software module host listing of modules when said determination reveals said existing software module was not in said listing of the second software module host, said added existing software module comprising said information; and adding said information to said existing software module when said determination reveals said existing software module was in said listing of the second software module host.

14. The non-transitory computer-readable storage medium of claim 10, wherein said adding and synchronization occurring in response to said request causes the webpage and the toolbar to modify how they respectively display content.

15. The non-transitory computer-readable storage medium of claim 10, further comprising:

converting said software module into a format of said first software module host, wherein said adding occurs upon the completion of said conversion; and storing, in a database on the network, a layout of said webpage based on said addition.

16. The non-transitory computer-readable storage medium of claim 10, further comprising:

converting said software module into a format of said second software module host, wherein said synchronization occurs upon the completion of said conversion; and storing, in a database on the network, a layout of said toolbar based on said synchronization.

17. A computing device comprising:

a processor;

a non-transitory computer-readable storage medium for tangibly storing thereon program logic for execution by the processor, the program logic comprising:

logic executed by the processor for receiving, via the computing device, a request associated with a first software module host associated with a web page, said request comprising a first request to customize the first software module host, and a second request to synchronize the first software module host with a second software module host associated with a toolbar application, said first request comprising information identifying a software module not presently associated with said web page;

logic executed by the processor for identifying, via the computing device in response to receiving said request, the first software module host on a network;

logic executed by the processor for adding, via the computing device, said software module to a listing of software modules associated with said first software module host, said addition of said software module host providing the web page associated with the first software module host with additional functionality not present prior to said addition;

logic executed by the processor for identifying, via the computing device in response to said request and said addition, the second software module host; and logic executed by the processor for synchronizing, via the computing device, the first software module host and the second software module host, said synchronization comprising adding said software module to a listing of software modules associated with said second software module host, said addition of said software module host providing the toolbar associated with the second software module host with additional functionality not present prior to said synchronization.

18. The computing device of claim 17, wherein said information identifying the software module further comprises information associated with an existing software module within said listing of said first software module host, said information associated with functionally not presently associated with said existing software module.

19. The computing device of claim 18, further comprising:

logic executed by the processor for adding said information to said existing software module associated with the first software module host.

20. The computing device of claim 18, further comprising:

logic executed by the processor for determining whether said existing software module is in said listing of the second software module host, wherein said addition synchronization further comprises:

logic executed by the processor for adding said existing software module to said second software module host listing of modules when said determination reveals said existing software module was not in said listing of the second software module host, said added existing software module comprising said information; and logic executed by the processor for adding said information to said existing software module when said determination reveals said existing software module was in said listing of the second software module host.

* * * * *